United States Patent [19]

Gustavsson

[11] 3,791,107

[45] Feb. 12, 1974

[54] OFF-GAS SYSTEM FOR NUCLEAR REACTORS

[75] Inventor: Eric Borje Gustavsson, Vasteras, Sweden

[73] Assignee: AB Asea-Atom, Vasteras, Sweden

[22] Filed: Jan. 20, 1972

[21] Appl. No.: 219,373

[30] Foreign Application Priority Data
Feb. 10, 1971 Sweden.............................. 1654/71

[52] U.S. Cl. ................................................ 55/179
[51] Int. Cl............................................ B01d 53/04
[58] Field of Search ....... 55/33, 58, 62, 66, 179, 74; 176/37, 60, 65

[56] References Cited
UNITED STATES PATENTS 3,362,883  1/1968  Wright................................. 176/37
3,501,923  3/1970  Lehmer.................................. 55/66
3,660,041  5/1972  Moore ................................. 176/37

Primary Examiner—Charles N. Hart

[57] ABSTRACT

An off-gas system for nuclear reactors includes a delay container to delay fission gases and two absorption units to absorb fission gases. An openable and closeable connection is provided from the outlet of the delay container to each of the absorption units. Arrangements are provided by which gas may be furnished to one end of each absorption unit while this unit is disconnected from the outlet of the delay container to pass through and regenerate the absorption unit and then to return to the delay container. This is done when the gas normally escaping from the absorber unit is found to contain fission gases.

5 Claims, 5 Drawing Figures

OFF-GAS SYSTEM FOR NUCLEAR REACTORS

BACKGROUND OF THE INVENTION

1. Field of the Invention

The present invention relates to an off-gas system for nuclear reactors.

THE PRIOR ART

When nuclear reactors are in operation strongly radioactive fission gases are produced in the form of various xenon and krypton isotopes. The half-life of these lies within the range of from about an hour up to a few days, except for $Kr_{85}$, the half-life of which is approximately 10 years. The radioactive fission gases cannot be released directly into the surroundings, but must be treated so that their radioactivity is reduced to a sufficiently low level or completely eliminated.

The fission gases are usually very much diluted in the other gases occurring in the nuclear reactor system, these consisting substantially of air and radiolytic gas in boiling water reactors, for example. The air comes mostly from leakage in turbines.

The gases from the nuclear reactor which contain fission gases are treated in special off-gas systems in connection with the reactor. In practice three different types of systems have so far been used. The first of these types is based on an absorption process. The off-gas system comprises an absorption column and a stripper column. The absorption column operates at low temperature, usually −90°C, using freon as absorption liquid for the fission gases. The stripper column acts as a distillation column. The fission gases and other gases absorbed by the freon which are stripped in this column are compressed and stored in a container until the radioactivity has decayed. The freon is recovered in condensed form in the stripper column. This off-gas system thus requires cooling equipment and is therefore extremely expensive. Its maintenance is also complicated by the many partial processes required.

A second type of off-gas system is based on an adsorption process at ambient temperature. Active carbon is primarily used as adsorption material, but other adsorption materials such as material of a molecular sieve type are also feasible. The off-gas system in this case may include a smaller delay container for fission gases and an adsorption unit connected to this container. The off-gases from the adsorption unit are released to the surroundings without being collected. In view of the long half-life for certain xenon isotopes, the adsorption unit must be extremely large so that these isotopes will have time to lose their radioactivity during the time they remain in the unit. During the adsorption process, each gas molecule is moved on in the adsorption unit as it is pushed away by another gas molecule from behind and the time during which the molecule remains in the unit depends on the size of the adsorption unit. $Kr_{85}$ which, as mentioned previously, has a half-life of about 10 years is not retained by this off-gas system, but is released to the surroundings. The greatest drawbacks with this system are that it must be extremely large and that it cannot remove $Kr_{85}$.

The third type of off-gas system is based on an adsorption process at extremely low temperature. The temperature is sufficiently low for the speed of the gas molecules moving through the adsorption unit to be so slight or the adsorption capacity of the adsorption unit so high that even $Kr_{85}$ remains in it, without however losing its radioactivity. The adsorption unit is regenerated by heating and drawing off the fission gases with a vacuum pump. The fission gases are then compressed and stored in a container until they have lost their radioactivity. As with the first off-gas system described, this system therefore requires expensive cooling equipment. The many operations required for its maintenance also makes it complicated.

SUMMARY OF THE INVENTION

The present invention relates to an off-gas system of the adsorption type which can operate without cooling equipment, the adsorption unit of which can have very little volume and which also has the ability to eliminate even $Kr_{85}$ from the off-gases. The invention is based on the principle that adsorption columns or adsorption units of another type included in the system are regenerated so that fission gases adsorbed are returned to the off-gas system and the off-gas system is thus used more than once as a delay space for the fission gases during their decaying.

The invention relates more specifically to an off-gas system for nuclear reactors comprising a delay container to delay fission gases and an adsorption unit to adsorb fission gases, the delay container having an inlet side for gases coming from the nuclear reactor and an outlet side for passing gases and the adsorption unit having an inlet side for gases coming from the delay container and an outlet side for passing gases, the delay container and the adsorption unit being connected to each other by an openable and closable connection conduit leading from the outlet side of the delay container to the inlet side of the adsorption unit and the outlet side of the adsorption unit being connected to an outlet conduit for leading away passing gas, characterised in that the outlet or inlet side of the adsorption unit is connected to an openable and closable supply conduit for the supply of a gas or steam having the ability to take up fission gases adsorbed in the adsorption unit and thus to regenerate the adsorption unit and the inlet side or outlet side of the adsorption unit which is not connected to the supply conduit is connected to the inlet side of the delay container by means of an openable and closable connecting conduit for transport of fission gases from the adsorption unit to the delay container.

The medium which is supplied to the outlet side of the adsorption unit or the inlet side may consist of air supplied from outside, for example, or some other inert gas such as nitrogen. It may also consist of water vapour supplied from outside. In the latter case it is suitable to arrange a condensor to condense the vapour in the connection conduit between the inlet or outlet side, respectively, of the adsorption unit and the inlet side of the delay container. While regeneration of the adsorption unit is taking place, the connection conduit between the delay container, outlet side, and the adsorption unit, inlet side, is closed. According to a preferred embodiment of the present invention the off-gases from the delay container are taken care of by an additional adsorption unit when the first adsorption unit is closed for regeneration. Before the fission gases start to leave the outlet side of this adsorption unit, this side is closed to any more off-gases from the delay container, to be regenerated in the manner described for the first adsorption unit, at the same time as the first adsorption unit is opened to receive off-gases from the delay container.

According to a particularly advantageous embodiment of the invention a certain amount of the off-gases from an adsorption unit receiving off-gases from the delay container is used as gas to regenerate an adsorption unit which is closed to gas supply from the delay container. In this way gas or vapour does not have to be supplied from the outside to the latter adsorption unit and an extremely simple and continuously operating off-gas system is obtained. By connecting a vacuum source in the connection between each adsorption unit and the inlet side of the delay container, the desorption process in the adsorption units is facilitated.

The delay container may consist of a container or other space which may be filled with sand or some other granular material or which is provided with partition walls which extend the path of the gas. The delay container may also be constructed from a long tube in several loops. The volume of the delay tank is at least 50 m³, preferably at least 100 m³. The adsorption units preferably consist of adsorption columns having active carbon or material of a molecular sieve type as adsorption material. It would in fact be feasible to use adsorption units of a different shape, for example horizontal tanks.

BRIEF DESCRIPTION OF THE DRAWINGS

The invention will be further explained by describing a number of embodiments with reference to the accompanying schematical drawings, in which.

DESCRIPTION OF THE PREFERRED EMBODIMENTS

Figure 1:
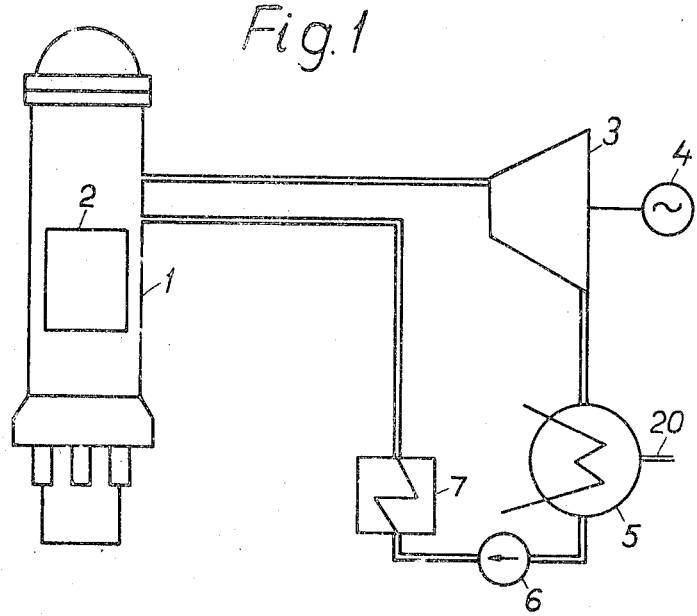
FIG. 1 shows a boiling water reactor plant selected as an example, FIG. 2 an off-gas system with gas supply from outside for regeneration of an adsorption column, FIG. 3 an off-gas system with steam supply from outside for regeneration of an adsorption column, FIG. 4 an off-gas system with gas supply from an adsorption unit operating as purifier to an adsorption column which is being regenerated and connected under vacuum, and FIG. 5 another off-gas system with gas supply from outside for regeneration of an adsorption column different from that shown in FIG. 2.

FIG. 1 shows only that part of a heterogeneous boiling water reactor plant which is of interest in connection with the treatment of fission gases. The water vapour produced in the core 2 of the BWR 1 drives the turbine 3 which in turn drives the generator 4. The steam leaving the turbine is condensed in the condensor 5. The condensed water is returned by the pump 6 through the preheater 7 to the reactor.

The gas phase of the condensor 5 is in contact through the conduit 20 with the off-gas system of the reactor which is shown in various embodiments in FIGS. 2 – 5.

In FIGS. 2 – 5:

21 is an ejector, for example in the form of a steam ejector which maintains vacuum in the condensor 5 and which may serve as a vacuum source in the off-gas system, 22 is an oxyhydrogen gas recombiner, for example in the form of a catalytic recombiner using palladium as catalyst, 23 is a delay container comprising a container having a volume of 100 – 300 m³, which is filled with sand, for example, 24 is a gas dryer, for example in the form of a container filled with silica gel, 25 and 26 are adsorption columns having a volume of about 0.5 m³, which are filled with active carbon, for example, 27 is the inlet side of the delay container, 28 is the outlet side of the delay container, 29 is the inlet side of the adsorption column 25

30 is the outlet side of the adsorption column 25

31 is the inlet side of the adsorption column 26

32 is the outlet side of the adsorption column 26

33 is a connection conduit between the outlet side 28 of the delay container 23 and the inlet side 29 of the adsorption column 25

34 is a connection conduit between the inlet side 29 of the adsorption column 25 and the inlet side 27 of the delay container 23, 35 is an outlet conduit for leading away passing gas from the outlet side 30 of the adsorption column 25

36 is a supply conduit for the supply of gas or steam to the outlet side 30 of the adsorption column 25

37 is a connection conduit between the outlet side 28 of the delay container and the inlet side 31 of the adsorption column 26

38 is a connection conduit between the inlet side 31 of the adsorption column 26 and the inlet side 27 of the delay container 23, 39 is an outlet conduit for leading away passing gas from the outlet side 32 of the adsorption column 26.

40 is a supply conduit for supply of gas or steam to the outlet side 32 is the adsorption column 26, 33A, 34A, 35A, 36A, 37A, 38A, 39A and 40A are valves in conduits 33, 34, 35, 36, 37, 38, 39 and 40, respectively, for opening, closing and regulating the flow through the conduits.

Figure 2:
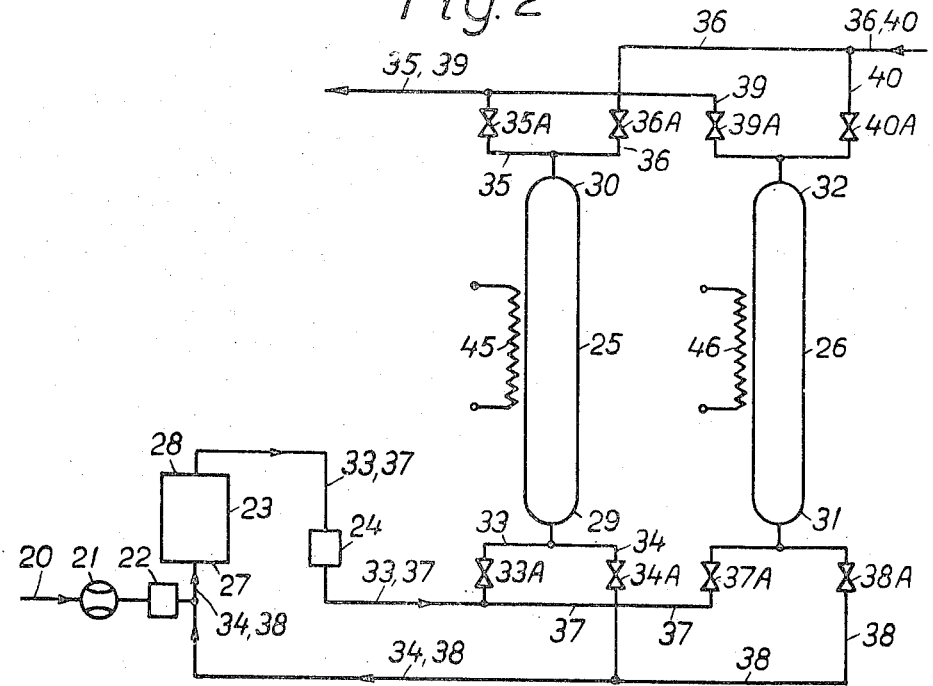

In accordance with FIG. 2 the off-gases are drawn from the condensor 5 through the conduit 20 by the ejector 21 in the off-gas system. After passing through the recombiner 22 the off-gases continue to the delay container 23. Here the passage of the fission gases and also any other gases through the off-gas system is delayed. The off-gases flow through the conduit 33 with the gas dryer 24 from the outlet side 28 of the delay container into the adsorption column 25 at the side 29. The valve 33A is at this time open and the valve 37A closed. The fission gases and other inert gases are adsorbed in the column 25, whereas other off-gases leave the column through the outlet side 30, conduit 35. The valve 35A is at this time open whereas the valve 36A is closed. When the fission gases start to appear at the outlet side 30 the valves 33A and 35A are closed and the valves 37A and 39A opened. The gases then flow through the conduit 37 from the delay container to the inlet side 31 of the adsorption column 26 and then leave the outlet side 32 of this column through the conduit 39 after having first given off their fission gases. The valve 40A is at this time closed. While the gases are being led through the column 26, the column 25 is regenerated with dry air which is introduced through the conduit 36 on the outlet side of the column 25 and withdrawn through the inlet side 29 of the column, the valves 36A and 34A being open. Before the dry air is led into the column 25, the column is heated by means of a heating device 45. During its passage through the column the heated air takes up fission gases in the column and carries them with it to the inlet side 27 of the delay container through the conduit 34. In this way the content of fission gases in the off-gas system is increased and this is used more efficiently to reduce the radioactivity in the fission gases. When the column 25 has been regenerated in the manner described and possibly cooled, it is ready to be used again for adsorption of fission gases. It is reconnected when the fission gases start to appear at the outlet side 32 of the column 26. The reconnection of the column 25 and disconnection of the column 26 is done by closing the valves 37A, 39A, 36A and 34A and opening the valves 33A and 35A. It is now the turn of the column 26 to be regenerated with dry air and heated by the heating means 46. The valves 40A and 38A are therefore open. Regeneration is performed in the same way as previously described for the column 25 and the fission gases taken up by the heated air are returned to the delay container through the conduit 38. The two columns are therefore used alternately for the adsorption process.

Figure 3:
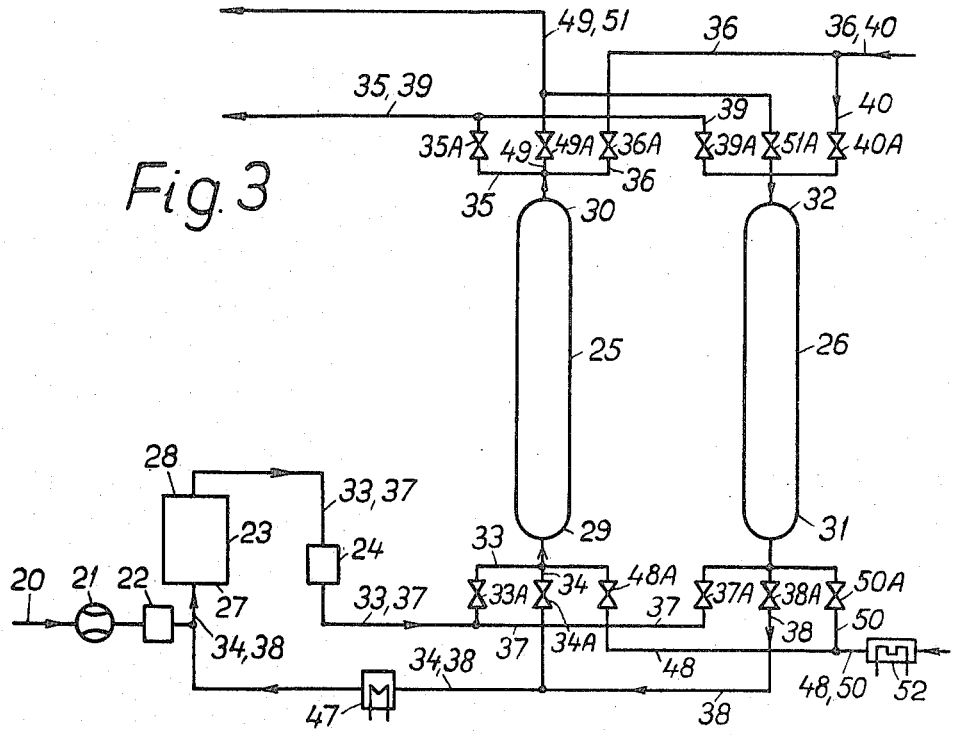

The device according to FIG. 3 operates in a similar manner to that shown in FIG. 2. The difference is that superheated steam is used instead of dry air for the regeneration. This means that a condensor 47 to condense the water vapour is connected in the connection 34 and 38, that is to say, between the inlet sides 29 and 31, respectively, of the adsorption columns and the inlet side 27 of the delay container. The adsorption column 25 is also connected on the inlet side to a conduit 48 for the supply of dry air and on the outlet side to a conduit 49 for leading away this air after it has passed through the unit. In a corresponding way the adsorption column 26 is connected to a conduit 50 for the supply of dry air and to a conduit 51 for leading away this air after it has passed through the column. Heating means 52 for the air are connected in the conduits 45 and 47. The valves in the conduits 48, 49, 50 and 51 are designated 48A, 49A, 50A and 51A. The dry air is allowed to pass through each column after the regeneration in order to dry it before it is connected once more to serve as adsorption unit. Valves for the supply and removal of off-gases and steam are then closed.

Figure 4:
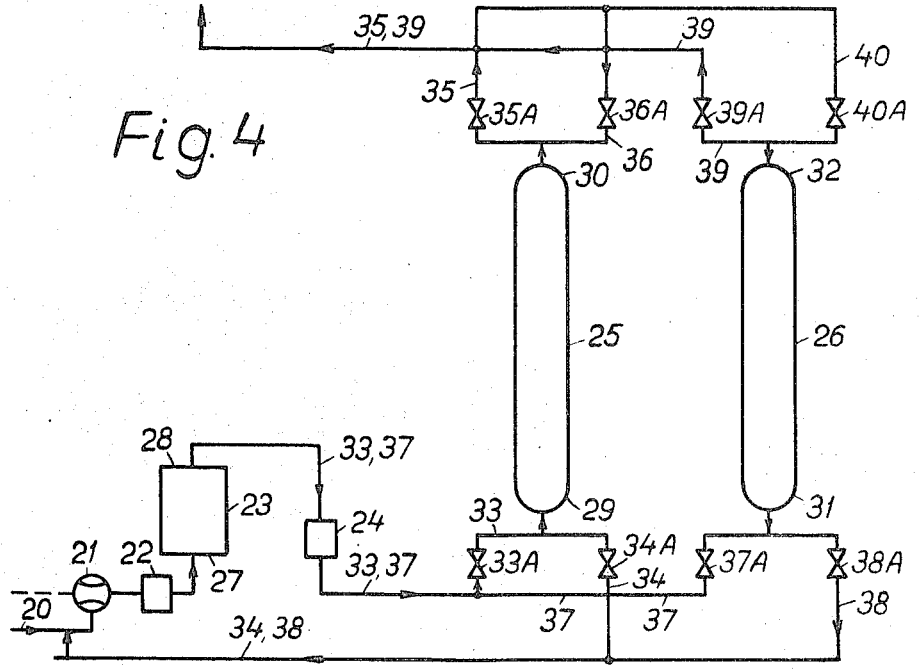

In the means according to FIG. 4, a portion of the off-gas leaving a column is used while the column is functioning, i.e., while an adsorption process is taking place in it, to regenerate another unit. If, therefore, the off-gases from the delay container 23 are led through the conduit 33 into the column 25 on its inlet side 29, and after the adsorption of the fission gases in the column are led away form the outlet side 30 of the column through the conduit 35, a portion of the gases led away through the conduit 40 can be used to regenerate the column 26 by being led in at its outlet side 32 and, after taking up fission gases in the column, being led to its inlet side 31, thence to be led through the conduit 38 to the inlet side of the delay container. During this process, the valves 33A, 35A, 40A and 38A are open, whereas the valves 34A, 36A, 39A and 37A are closed. When fission gases start to appear at the outlet side 30 of the column 25, the valves 33A, 35A, 40A and 38A are closed and the valves 34A, 36A, 39A and 37A opened. The column 26 will then be used for the adsorption while the column 25 is being regenerated. The off-gas system according to FIG. 4 operates at ambient temperature and has a minimum of movable parts. No media have to be supplied from outside for the regeneration. During the regeneration of the columns vacuum is maintained with the help of the ejector 21.

Figure 5:
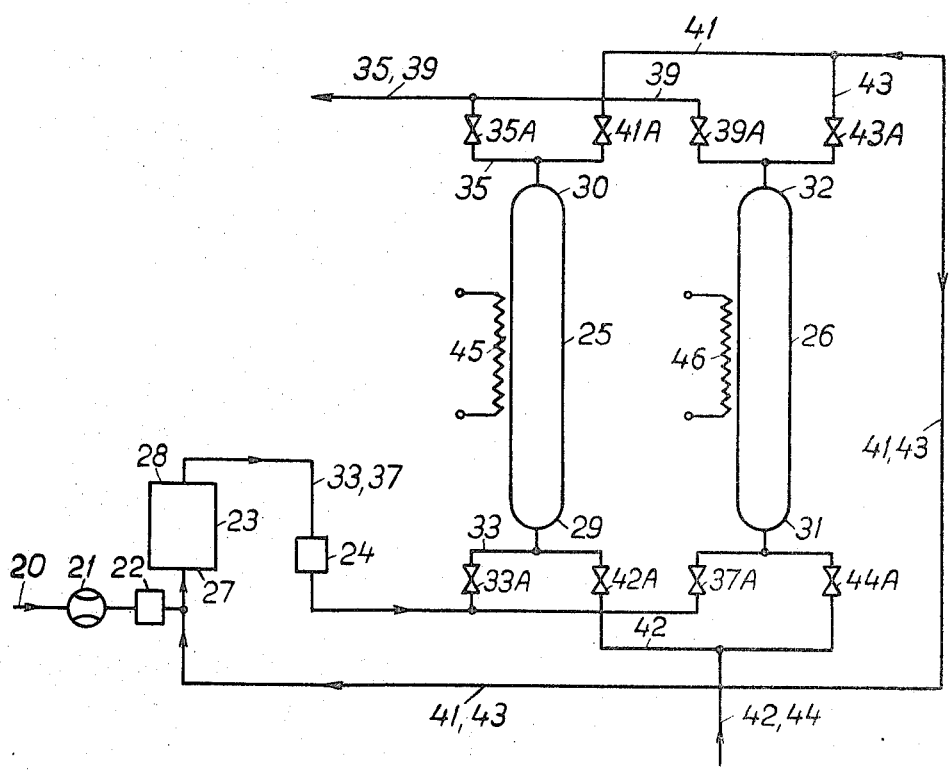
Figure 5:
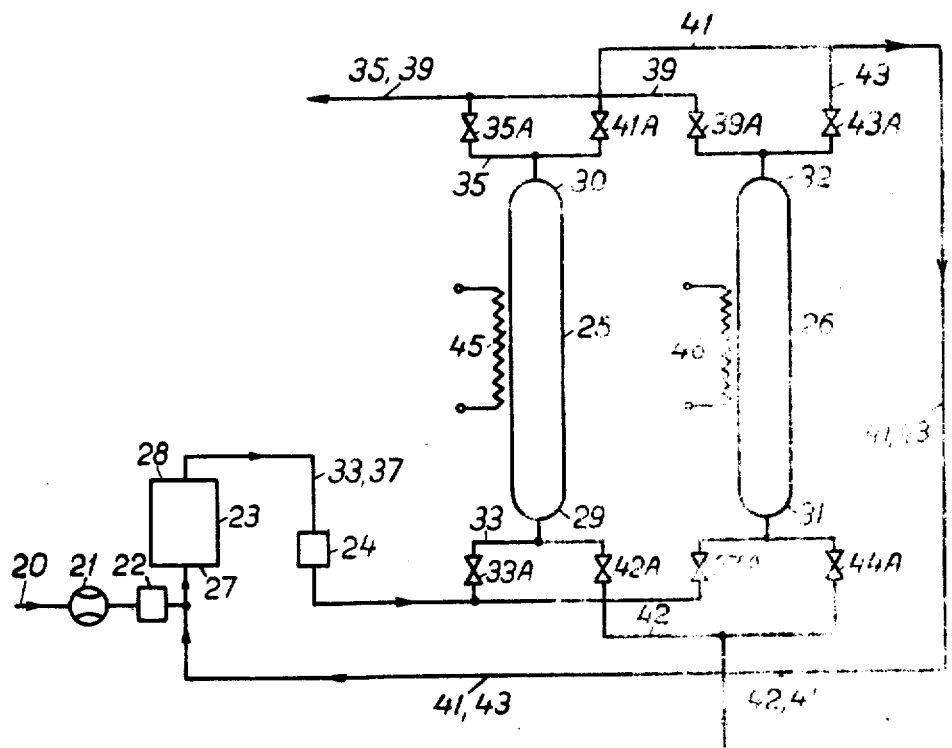

Referring now to FIG. 5, in addition to the parts which are identical in the earlier figures and which bear similar reference characters, 41 is a connection conduit between the outlet side 30 of the absorption column 25 and the inlet side 27 of the delay container 23, 42 is a supply conduit for supply of gas or steam to the inlet side 29 of the absorption column 25, 43 is a connection conduit between the outlet side 32 of the adsorption column 26 and the inlet side 27 of the delay container 23, 44 is a supply conduit for the supply of gas or steam to the inlet side 31 of the adsorption column 26, 41A, 42A, 43A and 44A are valves in conduits 41, 42, 43 and 44, respectively for opening, closing and regulating the flow through the conduits.

In accordance with FIG. 5 the off-gases after passage of the ejector 21, the recombiner 22 and the delay container 23 flow from the outlet side 28 of the latter through the conduit 33 with the gas dryer 24 into the adsorption column 25 at its inlet side 29. The valve 33A is at this time open whereas the valve 37A is closed. The fission gases and other inert gases are adsorbed as described in the previously illustrated systems in the adsorption column, while other gases leave the column at the outlet side 30 through the conduit 35. The valve 35A is at this time open whereas the valves 41A and 42A are closed. When fission gases start to appear at the outlet side 30 the valves 33A and 35A are closed and the valves 37A and 39A opened. The gases then flow through the conduit 37 from the delay container to the inlet side 31 of the adsorption column 26 and leave the outlet side 32 of this column through the conduit 39, after first having given off their fission gases. The valves 43A and 44A are at this time closed. While the gases are led through the column 26, the column 25 is regenerated with dry air which is led in through the conduit 42 at the inlet side 29 of the column 25 and out through the outlet side 30 of the unit, the valves 42A and 41A being open. The column and the air are heated in the same way as in the case shown in FIG. 2 with a heating means 45. During its passage through the column the heated air takes up fission gases in the column and carries them with it to the inlet side 27 of the delay container 23 through the conduit 41. When the column 25 has been regenerated and possibly cooled, it is ready to be used again for the adsorption of fission gases. It is connected when fission gases start to appear at the outlet 32 of the column 26. The connection of the unit 25 and disconnection of the column 26 is performed by the closing valves 37A, 39A, 41A and 42A and opening the valves 33A and 35A. The column 26 is then regenerated with dry air from the conduit 44 while being heated by the heating means 46. The valves 44A and 43A are then kept open. The fission gases taken up in the column 26 are returned to the delay container through the conduit 43.

In the device according to FIG. 5 the gas flow during the adsorption process and the regeneration process moves in the same direction, contrary to the case in the device according to FIG. 2. Otherwise the two devices operate in the same manner. In a manner similar to that in which FIG. 2 has been modified to operation acording to the device shown in FIG. 5, the means according to FIGS. 3 and 4 can be modified with the gas flowing in the same direction for the adsorption and regeneration processes.

It is clear that in the systems shown, more than two adsorption columns can be used, the columns performing adsorption and regeneration processes alternately. For example a portion of the off-gases from the column 25 can be used in the system shown in FIG. 4 to regenerate the column 26, a portion of the off-gases from the column 26 for regeneration. a third column, and so on, a portion of the off-gases from the last of such a row being used to regenerate the column 25.

Under certain circumstances it is also possible to operate with only one adsorption column. While the column is being regenerated, which takes place relatively quickly, the off-gases from the nuclear reactor can be taken care of in the delay container. The pressure will increase slightly in this, however.

I claim:

1. Off-gas system for nuclear reactors comprising a delay container to delay fission gases and an adsorption unit to adsorb fission gases, the delay container having an inlet side for gases coming from the nuclear reactor and an outlet side for passing gases and the adsorption unit having an inlet side for gases coming from the delay container and an outlet side for passing gases, means connecting the delay container and the adsorption unit to each other comprising an openable and closable connection conduit leading from the outlet side of the delay container to the inlet side of the adsorption unit, an outlet conduit connected to the outlet side of the adsorption unit for leading away passing gas, an openable and closable supply conduit connected to one side of the adsorption unit for the supply of a gaseous medium having the ability to take up fission gases adsorbed in the adsorption unit and thus regenerate the adsorption unit and means connecting the other side of the adsorption unit to the inlet side of the delay container comprising an openable and closable connecting conduit for transport of such gaseous medium and fission gases from the adsorption unit to the delay container.

2. Off-gas system according to claim 1, which comprises an additional adsorption unit, an openable and closable connection conduit connecting the inlet side of said additional adsorption unit to the outlet side of the delay container and an outlet conduit for leading away passing gas, connected to the outlet side of the additional adsorption unit an openable and closable supply conduit connected to one side of the additonal adsorption unit for the supply of a gaseous medium having the ability to take up fission gases adsorbed in the additional adsorption unit and thus regenerate the additional adsorption unit and means connecting the otherside of the additional adsorption unit to the inlet side of the delay container comprising an openable and closable connecting conduit for transport of fission gases from the additional adsorption unit to the delay container.

3. Off-gas system according to claim 2, in which the supply conduit of one of the adsorption units is connected to the outlet conduit of the other adsorption unit so that at least a portion of the gas which has passed the latter adsorption unit can be used to regenerate the first adsorption unit.

4. Off-gas system according to claim 1, in which means is provided to supply a vacuum to the connection conduit between one side of each adsorption unit and the inlet side of the delay container in order to produce a vacuum in the adsorption unit.

5. Off-gas system according to claim 1, in which the volume of the delay container is at least 50 m$^3$.

* * * * *

UNITED STATES PATENT OFFICE
CERTIFICATE OF CORRECTION

Patent No. 3,791,107                    Dated February 12, 1974

Inventor(s) Eric Borje Gustavsson

It is certified that error appears in the above-identified patent and that said Letters Patent are hereby corrected as shown below:

Figure 5 should appear as shown on the attached sheet:

Signed and sealed this 6th day of May 1975.

(SEAL)
Attest:

RUTH C. MASON
Attesting Officer

C. MARSHALL DANN
Commissioner of Patents
and Trademarks